UNITED STATES PATENT OFFICE.

WILLIAM ANTHONY SHAW, OF NEW YORK, N. Y., ASSIGNOR TO PETER NAYLOR, OF SAME PLACE.

IMPROVED COMPOSITION METAL FOR TUBING, PIPES, AND SHEETING.

Specification forming part of Letters Patent No. 97,972, dated December 14, 1869.

*To all whom it may concern:*

Be it known that I, WILLIAM ANTHONY SHAW, of the city, county, and State of New York, have invented a new and Improved Alloy or Composite Metal for use in the manufacture of various articles of commerce, and which is especially applicable to the manufacture of water or gas pipes, and sheet metal and foil; and I hereby declare the following to be a full, clear, and exact description of the same.

The object of this invention is to produce a metallic composition to be used in the manufacture of pipes, tubing, sheet metal, &c., which will not be liable to the corrosive action of water or other fluids, which may be passing through or stored in pipes, tanks, or other receptacles or conduits made of or lined with such metal, so that the water or other fluids thus stored or conducted may not prove injurious to the health of persons using the same, and so that the conduits or receptacles themselves may not be destroyed or weakened by corrosion, galvanic action, &c.

Again, it is my object to construct pipes, &c., that shall possess greater tensile strength and resistance to pressure than lead, tin, or tin-lined pipes, and, at the same time, be perfectly flexible, pliable, and capable of being plumbed and worked with plumbers' solder, and by any ordinary mechanic.

It is also my object to manufacture these articles at a less cost and expense than has been practicable with the materials heretofore used for such purposes.

All of these advantages I have attained by the use of the composition or alloy hereinafter described, and which I denominate "composite metal." This composite metal is composed of lead, block-tin, and antimony. In general, to produce an alloy having the characteristics stated in the first part of this specification, it will suffice to take the above-named metals in the following proportions: lead, say about ninety-five parts; block-tin, say about two and five-tenths parts; antimony, say about two and five-tenths parts—making one hundred parts. The component metals of this alloy should be commercially pure, and they should also be thoroughly mixed and commingled in forming the composition. The fusion and mixture of the metals are effected in any ordinary or suitable manner well-known to those skilled in the art to which this invention pertains. The proportions given will produce an article that will be unaffected by water in ordinary use, and also of greatly increased strength, and, therefore, of less cost than ordinary lead pipes, &c. I do not, however, confine my claim to the above specified proportions of the ingredients of the alloy, but the same may be advantageously varied in many applications, as in the manufacture of waste-pipes, &c., which will require more antimony and tin than I have named. The pipes may be made on any ordinary pipe-machine, and the sheet metal rolled by any of the well-known methods.

Pipes, tubing, and sheet metal may also be manufactured of this alloy, with a facing on one or both sides of pure lead, applied in any ordinary or suitable manner, forming a new article of manufacture which can be used to advantage in various chemical operations and in other connections where a pure lead facing or surface is required; or tubes, sheets, and other articles of this composite metal may be tinned, if desired, any suitable process for this purpose being employed—such, for instance, as described in Letters Patent granted to me on the 10th day of March, 1863.

Pipes and tubing of varying qualities or grades are made of this metal, and, in order to furnish some distinguishing mark by which the different grades may be known, I form upon the exterior of the pipe, and extending throughout its length, one or more longitudinal ribs or ridges of half-round or other suitable shape, the number of ribs indicating the grade or strength of the pipe. Thus, what is known as "extra light pipe" will be shown by one bar or rib, "light pipe" by two bars, "strong pipe" by three bars or ribs, "extra strong pipe" by four ribs, and so on. The ribs may be formed by making grooves in the die in which the pipe is made.

Having now described my invention and the manner in which the same is or may be carried into effect, what I claim, and desire to secure by Letters Patent, is—

1. An alloy or composite metal adapted to the manufacture of pipes, tubing, sheet metal, and other articles, as specified, composed of lead, block-tin, and antimony in the proportions substantially as set forth.

2. The manufacture of pipes, tubing, sheet metal, and other articles for conducting or receiving water or other fluids, of an alloy or composite metal, such as herein described.

3. Pipes or sheets composed of an alloy such as herein described, when faced on one or both sides with pure lead, substantially as and for the purposes stated.

4. The formation upon composite metal tubing, such as described, of one or more longitudinal ribs or ridges, as and for the purposes specified.

In testimony whereof I have signed my name to this specification before two witnesses.

WM. ANTHONY SHAW.

Witnesses:
A. POLLOK,
WM. H. McCABE.